Sept. 30, 1952     R. P. INGRAHAM ET AL     2,612,194
TREE FELLING DEVICE
Filed March 24, 1948     2 SHEETS—SHEET 1
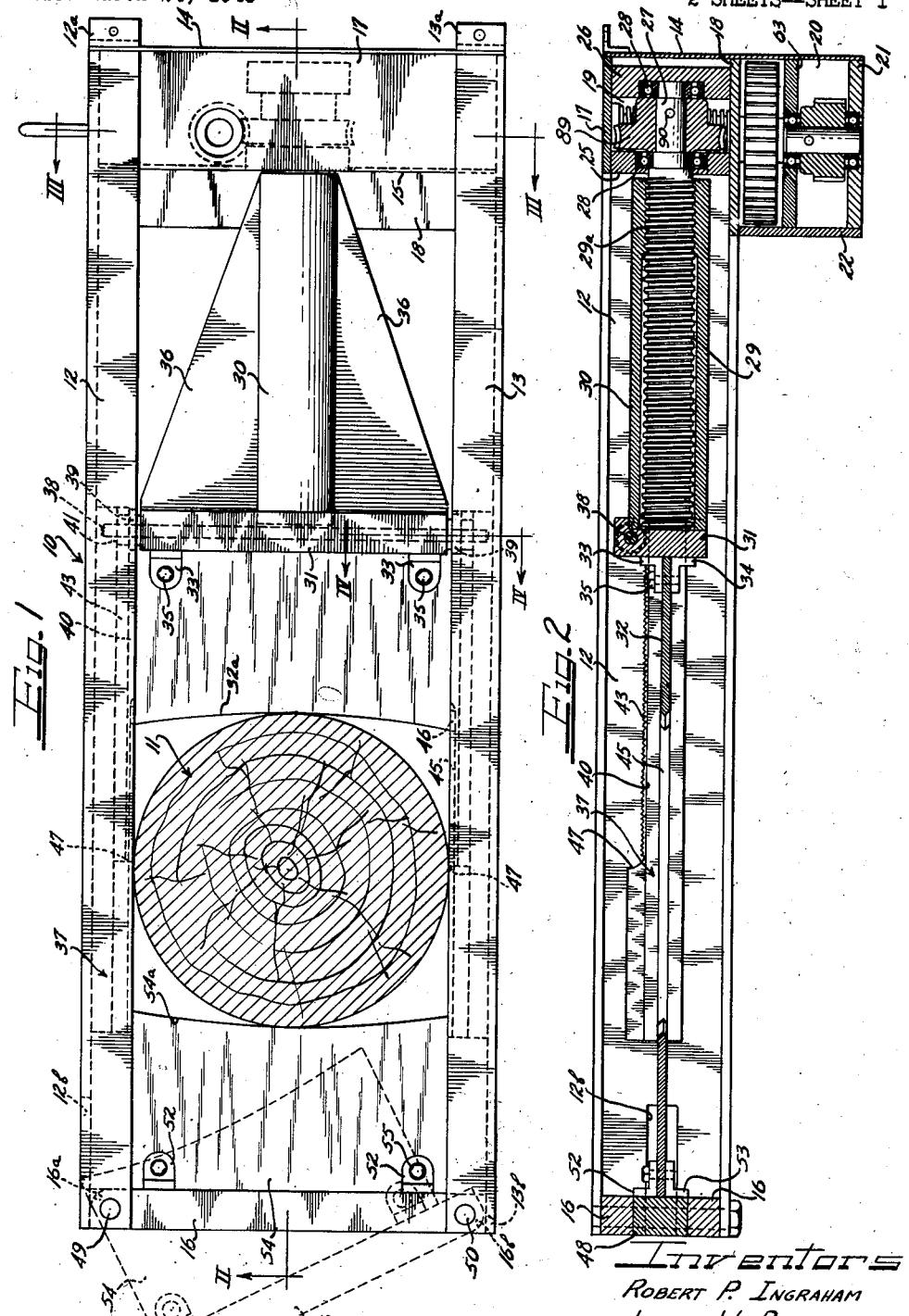
Inventors
ROBERT P. INGRAHAM
JOSEPH W. PHILLIPS
SAM E. GANIS

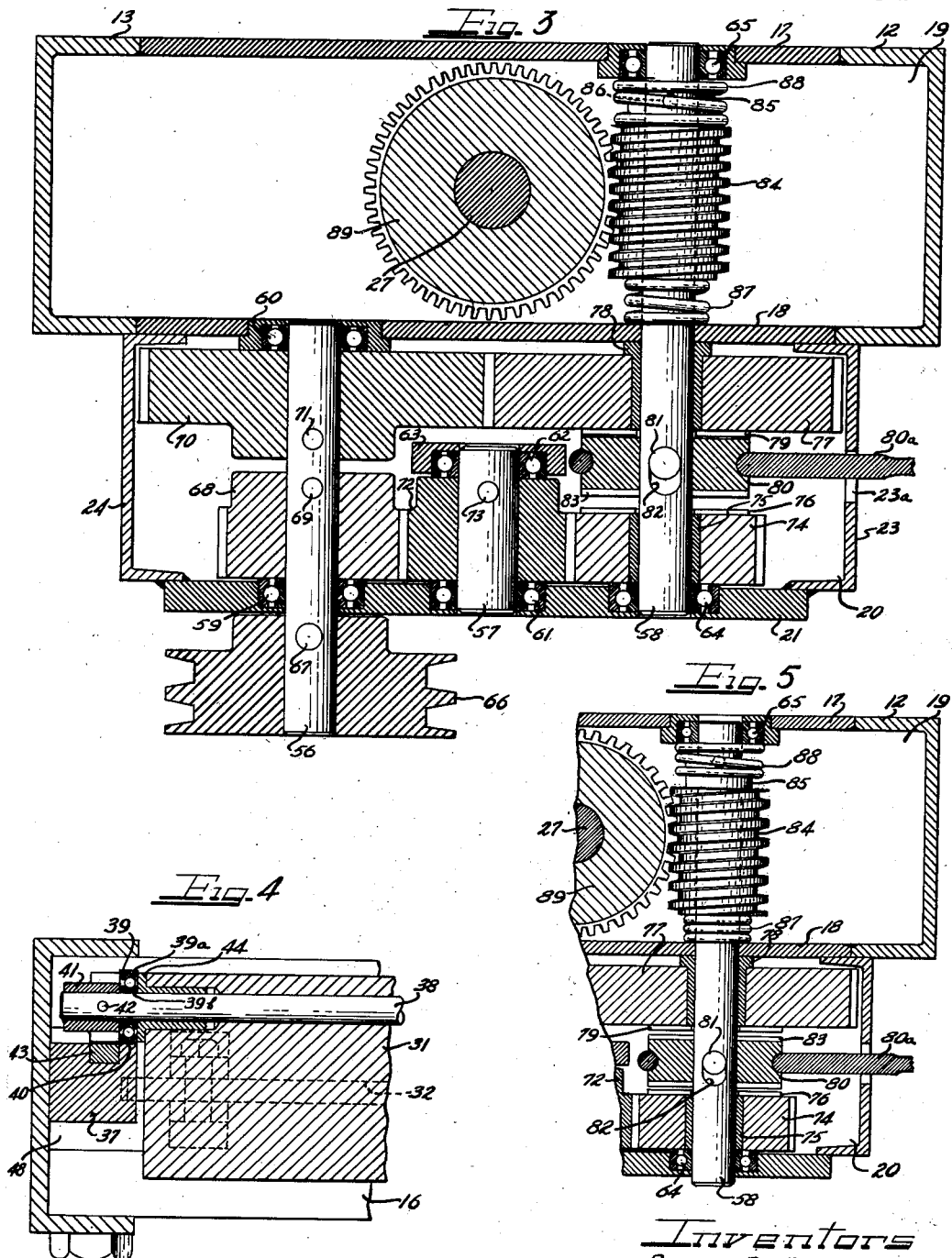

Patented Sept. 30, 1952

2,612,194

UNITED STATES PATENT OFFICE 2,612,194

TREE FELLING DEVICE

Robert P. Ingraham, San Antonio, Tex., and Joseph W. Phillips, Chicago, and Sam E. Ganis, Evanston, Ill., assignors, by mesne assignments, of two-thirds to said Robert P. Ingraham Application March 24, 1948, Serial No. 16,806

5 Claims. (Cl. 144—34)

The present invention relates to a cutting device and more particularly to a portable power-driven apparatus by means of which trees, lumber, brush and other like material may be quickly and easily severed.

Heretofore, conventional hand tools such as saws, axes, etc. or power-driven saws have been employed for such operations. The amount of skilled manual labor and time involved in the use of hand tools have made their use economically undesirable. Power-driven saws are an improvement over hand tools but are expensive to purchase and maintain in operating condition. The saw teeth must be frequently sharpened and are easily broken upon contact with knots or other obstructions in the tree or other objects being cut. In addition, power saws are bulky and require a crew of trained operators to use.

The present invention now provides a tree felling device which is portable, simple in operation and inexpensive in cost and maintenance. The device comprises a frame member adaptable to fit around the object to be cut and carrying a pair of cutting blades. One of the blades is pivotally attached to the frame so that the device may be clamped to a tree or similar object in cutting engagement therewith. The second blade, which is movable within the frame and is guided thereby, is operated by means of a gear train connected to a suitable source of power, such as an electric motor, internal combustion engine or the power take-off in a tractor, truck or the like by a V-belt pulley sheave and V-belt or other suitable means.

Power is transmitted by suitable gearing from the power source to a screw threaded in a mating sleeve attached to the movable blade. The gear train consists of a shaft carrying a V-belt pulley and geared to a second shaft carrying a worm. The shafts are so geared that the first shaft and second shaft may be rotated in either the same or different directions. A simple clutch is provided to determine the direction of rotation of the second shaft. The worm engages a worm gear keyed to the blade screw. The blade may thus be moved within the frame in either a forward or rearward direction as determined by the position of the clutch.

The second shaft is journalled in its bearings and is capable of limited axial movement therein. In case the movement of the movable blade in either a forward or rearward direction is arrested, as at the end of a stroke or upon striking an obstruction, the worm gear tends to stop and the worm will unscrew itself to move the shaft axially within its bearings, the movement of the shaft in throwing the clutch out of engagement with the gear train serves to disconnect the power source and thus to prevent damage to the device.

It is, therefore, an important object of the present invention to provide a portable power-driven tree felling device.

It is another important object of the present invention to provide a tree felling device to be attached to a tree in cutting engagement therewith, which comprises a movable blade driven from a suitable source of power through a clutch, the position of which is manually controllable to determine the direction of movement of the blade but automatically adjusted to a neutral position upon the blade meeting excessive resistance in order to prevent damage to the device.

It is a further object of the present invention to provide a cutting device comprising a frame, a movable cutting blade guided by the frame and driven by a suitable power source through a gear train, and a knockout clutch in the gear train to prevent injury to the mechanism in the event that the movement of the cutting blade is arrested.

It is a still further object of the invention to provide a gear train for the forward or rearward movement of the blade of a tree cutting device or the like comprising a pair of shafts adapted to be rotated in the same or opposite direction by a suitable power source, a worm carried by one of the shafts in mesh with the worm gear adapted to drive a screw and mating sleeve in either a forward or rearward direction and a knockout clutch for determining the direction of rotation of the worm gear and the direction of movement of the sleeve, the clutch disengaging the gear train upon an interruption of the movement of the sleeve in either a forward or rearward direction, whereby injury to the gear train is avoided in case the movement of the sleeve is arrested.

Other and further objects of this invention will be apparent from the disclosures in the specification and the accompanying drawings.

On the drawings:

Figure 1 is a plan view of the tree felling device of the present invention illustrating the method of employing the device;

Figure 2 is a cross-sectional view with parts shown in elevation taken along the lines II—II of Figure 1;

Figure 3 is a cross-sectional view with parts shown in elevation taken along the lines III—III of Figure 1;

Figure 4 is a fragmentary cross-sectional view with parts shown in elevation taken along the lines IV—IV of Figure 1 and illustrating the mounting of the movable cutting blade; and Figure 5 is a cross-sectional view with parts shown in elevation similar to Figure 3, illustrating the operation of the clutch.

As shown on the drawings:

In Figure 1, the reference numeral 10 indicates a tree cutting device of the present invention and reference numeral 11 indicates a tree, log or similar article to be severed by the use of the device 10. As illustrated, the device 10 comprises a frame defined by parallel channel frame members 12 and 13 which are joined by fixed end plates 14 and 15 at one end of the frame and by latchable hinged members 16 at the other end. Frame members 12 and 13 carry mounting flanges 12a and 13a by means of which the device 10 may be mounted on a suitable support.

As shown in Figures 2 and 3, top and bottom plates 17 and 18 join frame members 12 and 13 and cooperate with frame members 12 and 13 and plates 14 and 15 to define an inner gear chamber 19 at one end of the device.

A second gear chamber 20 is located adjacent chamber 19 and is defined by plate 21 parallel to plates 17 and 18 and joined to plate 14; plate 22 parallel to plate 14 and extending between plates 21 and 18; and channel members 23 and 24 joining plates 21 and 18.

Bearing plates 25 and 26 are positioned within chamber 19 between the opposed plates 17 and 18. A shaft 27 is journaled in bearings 28 carried by the plates 25 and 26. A screw 29, formed on an extension of the shaft 27 extends from the bearing plate 26 through gear chamber 19 and into the area lying between the frame members 12 and 13. The screw 29 extends into a mating sleeve 30 (Figs. 1 and 2), which is internally threaded for a part of its length, as at 29a for inter-threading engagement with said screw.

The sleeve 30 is secured at one end to a blade support 31, which carries a movable cutting blade 32 attached thereto by supporting lugs 33 and 34 secured to the support 31. Bolts 35 extend through the lugs 33 and 34 and the blade 32 to removably attach the blade to the support 31. The leading edge 32a of the blade 32 is formed as a sharpened, concave cutting edge. The sleeve 28 is provided with triangular bracing webs 36 to lend rigidity and strength to the sleeve 30 along its entire length.

As best shown in Figure 2, a guiding block 37 is provided along the interior surfaces of each frame member 12 and 13. The blade supporting member 31 is supported between frame members 12 and 13 by means of a shaft 38 which extends through the member 31 and which is supported between the frame members 12 and 13 by bearings 39 riding on upper surfaces 40 of the guide blocks 37, as shown in Figure 4. The outer races 39a of bearings 39 bear against the surfaces 40 of support block 37 and the inner races 39b receive the shaft 38 as shown in Figure 4. Pinion gears 41 are attached to shaft 38 by pins 42 in a position adjacent the bearings 39. Racks 43 are provided on the upper surfaces of guide blocks 37 for engagement with the pinions 41. The bearings 39, which are held in position on the shaft 32 by bushings 44 and pinions 41, support the weight of the support member 31 and blade 32.

The guide block 37 also carries slots 45 extending along the length thereof and receiving projections 46 formed at either extremity of the forward cutting edge 32a of the blade 32 as shown in Figure 1. The slots 45 and projections 46 serve to guide the blade within the frame and strengthen the blade structure during operation of the device. Stops 47 are provided at one end of the surfaces 40 against which the bearings 39 abut to stop the forward movement of the blade 32 at the end of a cutting cycle.

As may be seen in Figure 1, the parallel, spaced apart members 16 are removably secured to the far end of frame members 12 and 13 by bolts 49 and 50, respectively. Member 48 is disposed between hinged members 16 and also extends between frame members 12 and 13. The bolts 49 and 50 extend through frame members 12 and 13, parallel members 16 and member 48 to hold the hinged end assembly in position. If desired the members 16 and 48 may be secured together as by welding or may be formed as a single integral member. The member 48 carries pairs of blade supporting lugs 52 and 53 one pair near either extremity of the member. A second cutting or backing blade 54, similar in design and size to the blade 32 and having a concave forward cutting edge 54a, is firmly held in place between the lugs of each pair of lugs 52 and 53 by bolts 55. As shown in dotted outline in Figure 1, the members 16 and 48 may be swung about the bolt 50 by removing the bolt 49 and pulling downwardly and outwardly on the members 16 and 48. The frame member 12 is cut out as at 12b, frame member 13 is cut out as at 13b, and opposite corners of members 16 and 48 are rounded as at 16a and 16b to allow this swinging movement of members 16, 48 and the attached blade 54. The members 16 and 48 and the attached blade 54 may thus be swung out of the way so that the device 10 may be affixed to a tree, log or similar article to be severed. The device is placed upon the tree with the members 12 and 13 extending on either side thereof and with the blade 32 against the tree as shown in Figure 1. The members 16, 48 and the backing blade 54 are then swung back into the position shown in solid outline in Figure 1 and Figure 2 so that the tree or log is positioned between the cutting blade 32 and the backing blade 54. The cutting edges 32a and 54a have a slight concave curvature to prevent side pressures on the object 11 and to keep the object centralized within the frame.

Movement of the blade 32 within the frame of the device 10 is accomplished by a gear train housed in the gear chambers 19 and 20 and driving the screw 29, the mating sleeve 30 and the blade support 31.

The gear train within chambers 19 and 20 comprises three shafts 56, 57 and 58 journaled in the chamber walls as shown. Shaft 56 is journaled in bearings 59 and 60 carried by the plates 21 and 18, respectively; shaft 57 is journaled in bearings 61 and 62 carried by plate 21 and plate 63, respectively. Plate 63 is supported in gear housing 20 between the plates 14 and 22, as shown in Figure 2. The shaft 58 is journaled in bearings 64 and 65 carried by plates 21 and 17, respectively. Shaft 58 is mounted in bearings 64 and 65 so as to be capable of limited axial movement toward either of the plates 17 or 21. A pulley, V-belt sheave, or similar means 66 is secured to shaft 56 by a pin 67 for rotation with the shaft 56. A gear 68 is secured to shaft 56 within the gear chamber 20 by a pin 69. A gear 70, larger than gear 68, is also secured to shaft 56 by a pin 71 within the chamber 20. A gear 72 of size equal to gear 68 and in mesh therewith, is secured to shaft 57 by pin 73. A third gear 74 of size equal to gears 68 and 72 is mounted on shaft 58 in mesh with gear 72. Gear 74 is mounted on shaft 58 for rotation independently of the shaft by means of sleeve bearing 75. Gear 74 is provided with teeth 76 on its inner lateral face. A gear 77 of size equal to gear 70 is mounted on shaft 58 for rotation independently of the shaft, the gear being mounted on a sleeve bearing 78. Gear teeth 79 are cut in the inner lateral faces of the gear 77. A clutch 80 is slidably mounted on shaft 58 by means of pin 81 which extends through an elongated slot 82 formed in the shaft 58. The clutch 80 has teeth 83 formed in its opposed lateral faces and carries a handle 80a which is formed as a ring surrounding the smooth peripheral surface of the clutch 80 having an integral handle portion extending through aperture 23a in plate 23. The clutch 80 is slidable along the shaft 58 so that the teeth 83 on the lateral faces of the clutch 80 may engage either the teeth 76 formed on the inner lateral face of the gear 74 or the teeth 79 formed on the inner lateral face of the gear 77.

Thus, it may be seen that the driving shaft 56 and the driven shaft 58 may be rotated in either the same or different direction by manipulation of the clutch 80. The shafts may be rotated in opposite directions by the engagement of clutch 80 with gear 77, the rotation of shaft 58 being accomplished through driving gear 70 secured to shaft 56, driven gear 77 rotatable on shaft 58 and clutch 80 secured to shaft 58. The rotation of shafts 56 and 58 in the same direction is accomplished by sliding clutch 80 along shaft 58 to engage the teeth 76 formed in the inner lateral face of gear 74. The shaft 58 is then driven by gear 68 secured to driving shaft 56, the idler gear 72 which serves as a reversing gear, the gear 74 rotatable on shaft 58 and clutch 80 secured to shaft 58.

A worm 84 is carried by shaft 58 within gear chamber 19. Worm 84 is provided with an integrally formed boss portion 85 pinned to shaft 58 by pin 86. The shaft 58 also carries compression springs 87 and 88 which are mounted in the chamber 19 on either side of the worm 84 between the worm 84 and the plate 18 and between the worm 84 and the bearing 65, respectively. The boss 85, having a diameter equal to the inner diameter of spring 88, extends into the interior of spring 88 to prevent displacement of spring 88. The shaft 58 is slidably mounted for limited axial movement within the bearings 64 and 65 and the springs 87 and 88 serve to resiliently maintain the shaft in position within the bearings. The springs 87 and 88 are capable of compression only and there is no torque force exerted against the worm 84 or the shaft 58 when the shaft is maintained in its normal position.

A worm gear 89 is mounted on shaft 27 within the chamber 19, as shown in Figures 2 and 3. As shown in Figure 2, shaft 27 is journaled in bearings 28 carried by plates 25 and 26. Worm gear 89 is secured to shaft 27 by a pin 90, as shown in Figure 2.

In the operation of the tree cutting device 10, the device is first attached to the tree or logs to be severed, as above described, by means of the latchable hinged members 16 and 48. Following the positioning of the blades 54 and 32 against either side of the article to be severed, the pulley or sheave 66 is attached to a suitable source of power such as an internal combustion engine, an electric motor, or the drive shaft or power takeoff in a tractor, truck, or other suitable power source by suitable means such as a V-belt. Rotation of the pulley 66 will serve to rotate the shaft 56 and the gears 68 and 70. Rotation of the gear 68 will cause a corresponding rotation at the reversing gear 72 and the gear 74. However, rotation of the gear train consisting of gears 68, 72 and 74 will not cause a corresponding rotation of the shaft 58 due to the provision of the bearing sleeve 75. Rotation of the gear 70 will likewise cause a corresponding rotation of the gear 77, which rotation of the gear 77 will not cause rotation of the shaft 58. To cause forward movement of the movable blade 32 in the device 10, the clutch 80 is moved manually through handle 80a on the shaft 58 by movement of pin 81 in slot 82 until the gear teeth 83 in the face of the clutch 80 engage the teeth 79 formed in the lateral face of the gear 77. Thus, due to the engagement of the clutch 80 with the inner lateral face of gear 77, rotation of the gear 77 through gear 70 will cause a corresponding rotation of the clutch 80 and through the pin 81 of the shaft 58. Rotation of the shaft 58 will cause a corresponding rotation of the worm 84 which is pinned to the shaft 58. Rotation of the worm 84 will rotate worm gear 89 and the shaft 27. Rotation of the shaft 27 will cause a movement of the screw 29 which is formed as an extension of the shaft 27. Rotation of the screw 29 will result in the movement of sleeve 30 along the surface of the screw to carry the blade supporting block 31 forward moving the blade 32 into cutting engagement with the object 11 to be severed. The movement of the blade within the frame is guided by engagement of the blade projections 46 in the slots 45 formed in the guide blocks 37 carried by the frame members 12 and 13. During movement of the blade support 31 and blade 32 the bearings 39, as illustrated in Figure 4, will move along the surfaces 40 of the support blocks 37 to carry the weight of the blade 32 and the support block 31. Engagement of the pinion 41 and the rack 43 will aid in guiding the movement of the support block 31 and the sleeve 30 during the forward movement of the blade 32. If it is desired to stop the forward motion of the blade 32, the handle 80a of clutch 80 is moved to throw the clutch out of engagement with the gear 77. Thus, there would be no driving relation between the gear 77 and the shaft 58.

If it is desired to reverse the direction of the movement of the blade 32 the clutch 80 is moved by means of handle 80a to bring the teeth 83 of clutch 80 into engagement with the teeth 76 in the inner lateral face of gear 74. Due to the provision of reversing gear 72, the shafts 56 and 58 will then rotate in opposite directions and the rotation of the worm and the worm gear will be the reverse of that attained with the gear 77 driving shaft 58, the direction of rotation of the screw 29 will be reversed and the sleeve 30 will move backwardly along the screw 29 to retract the blade.

The forward movement of the blade 32 within the frame caused by engagement of gear 77 and clutch 80 is halted at the end of a cutting cycle by the stops 47 located on support blocks 37. The stops 47 are so positioned that the bearings 38 will engage the stops at the end of a cycle of forward movement. Upon halting either the forward or rearward motion of the blade as at the end of a cycle or by the blade 32 encountering an excessive resistance in the object to be severed, such as a knot or other obstruction in the tree or log being severed, the clutch 80 is kicked out of engagement with gear 77 to prevent harm to the gear train and other apparatus.

The disengagement of the clutch 80 during the forward movement of the blade 32 is accomplished by axial movement of the shaft 58 within its bearings against the spring 87 as illustrated in Figure 5. When the forward motion of the blade is halted, further movement of the blade support 31, the sleeve 30 and the screw 29, is also prevented. When the screw 29 ceases to rotate, the rotational movement of the shaft 27 and the worm gear 89, which is pinned thereto, is also arrested. Stopping the movement of the gear 89 will cause the worm 84 to unwind itself so as to assume a position as shown in Figure 5. This movement of the worm 84 causes a corresponding movement in the shaft 58 which is slidably mounted in the bearings 64 and 65. The movement of the worm 84 and the shaft 58 compresses the spring 87. The clutch 80 which is pinned to the shaft 58 by pin 81 is also moved with the shaft 58 and is pulled out of engagement with the inner lateral face of gear 77. The disengagement of the clutch 80 and gear 77 releases shaft 58 from its driven relation with shaft 56 to halt the rotation of shaft 58 and damage to the gear train by movement against excessive resistance is averted. The distance through which the shaft 58 may be moved axially by compression of the spring 87 is less than the distance through which the clutch 80 must be moved to engage gear 74 to cause the movement of shaft 58 in the opposite direction. Thus the movement of blade 32 is merely halted upon encountering excessive resistance.

The movement of the blade 32 in a rearward direction by the driving of shaft 58 through the gears 68, 72, 74 and clutch 80 is halted upon encountering excessive resistance by axial movement of the shaft 58 within its bearings against the spring 88. The clutch 80 is disengaged by the movement of the worm 84 on worm gear 89 toward the wall 17 and the compression of the spring 88 by movement of shaft 58 in a manner similar to that above described.

The springs 87 and 88 are of sufficient compressive strength that the resistance normally encountered during the cutting operation will not cause an axial displacement of shaft 58 and the disengagement of clutch 80 from either of the gears 74 or 77. The actual compressive strengths of the springs will vary with the design of the cutting device and the nature of the objects to be severed. It should be understood that the springs 87 and 88 are capable of compression only and that no unbalanced load is placed upon the worm 84 by either of the opposing springs when the device is employed to sever an object presenting a normal resistance to the movement of the blade. However, should a knot or other obstruction in the object present an excessive resistance against which the blade cannot be moved, the clutch is automatically adjusted to a neutral position by axial displacement of the driven shaft against one of the compression springs. The clutch will also become disengaged to interrupt the driving relation between the driving and driven shafts upon the completion of a cycle of movement of the cutting blade in either a forward or rearward direction.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A tree felling or similar device comprising a frame having fixed parallel side members, a fixed end member, a second end member pivotally supported by one of said side members and latching means for securing said second end member to the other of said side members, a cutting blade carried by said pivotally supported second end member, a second cutting blade carried by said side frame members and guided thereby for movement within the frame, means carried by the side members and the fixed end member of said frame for driving said second cutting blade including a shaft driven by a power source, a second shaft changeably geared to said first shaft for movement in the same or opposite direction, means mounting said second shaft for limited axial movement, opposed compression springs normally resisting movement of said second shaft in either direction, a worm carried by said second shaft and rotatable therewith, a worm gear in mesh with said worm, a screw rotatable with said worm gear, a mating sleeve in driven engagement with said screw for effecting movement of said second cutting blade within the frame, and clutch means mounted on said second shaft for determining the direction of rotation of said second shaft and the direction of movement of said second cutting blade within the frame, said clutch means being automatically shiftable to a neutral non-driving position in response to axial movement of said worm.

2. A tree felling and cutting device comprising a frame for surrounding an object to be cut having fixed parallel side members, a fixed end member, a second end member pivotally supported by one of said side members, means for attaching said pivotally mounted end member to the other of said side members, a backing blade carried by said pivotally supported end member, a cutting blade movable within the frame and guided by said side members, and means for driving said movable cutting blade comprising a power transmitting screw for moving said movable blade in either direction, a worm gear for driving said screw, a driven shaft mounted for axially shiftable movement, a worm fixedly mounted on said shaft in mesh with said worm gear, opposed compression springs on said shaft at opposite ends of said worm, a driving shaft, gears on said driving shaft, gears freely rotatable on said driven shaft engageable directly and through a reversing gear with said first gears, and a clutch rotatable and axially shiftable with said driven shaft for driving engagement with either of said gears on said driven shaft, the compressive strength of said springs being such that when there is excessive resistance to movement of said movable blade in either direction said worm gear will tend to stop, said worm will unscrew itself compressing one of said springs and causing sufficient axial movement of said driven shaft to disengage said clutch from driving relation with the gear with which the same was previously engaged.

3. In a power driven cutting device including a frame for surrounding an object to be cut, a backing blade and an opposed movable blade, means for driving said movable blade comprising a power transmitting screw for moving said movable blade in either direction, a worm gear for driving said screw, a driven shaft mounted for axially shiftable movement, a worm fixedly mounted on said shaft for axial and rotational movement therewith and meshing with said worm gear, opposed compression springs on said shaft contacting opposite ends of said worm, a driving shaft, gears on said driving shaft, gears freely rotatable on said driven shaft meshing directly and through a reversing gear with said first gears, and a clutch rotatable with said shaft and axially shiftable thereon to driving engagement with either of said gears and to a neutral non-driving position on said driven shaft, the compressive strength of said springs being such that when there is excessive resistance to movement of said movable blade in either direction said worm gear will tend to stop, said worm will unscrew itself on said worm gear compressing one of said springs and causing sufficient axial movement of said driven shaft affixed to said worm to disengage said clutch thereon from driving relationship with the gear with which the same was previously engaged.

4. A tree felling or similar device comprising a frame having fixed parallel side members, means secured to said side members adjacent one end thereof to define an enclosed gear box, a worm gear therein, an end member pivotally secured to the other end of one of said side members, latching means for securing said second end member to the other of said side members, a first cutting blade carried by said pivotally mounted end member, a second cutting blade carried by said side members and guided thereby for movement within said frame towards and away from said first cutting blade, means housed within said gear box and lying between said side members for driving said second cutting blade including a shaft journaled in said gear box and adapted to be driven by a power source, a second shaft having limited axial movement journaled in said gear box and geared to said first shaft for movement in the same or opposite rotational direction, a worm fixedly carried by said second shaft for rotation and axial movement therewith, said worm gear being in mesh with said worm, a screw rotatable with said worm gear, a mating sleeve in driven engagement with said screw for effecting movement of said second cutting blade within the frame, clutch means mounted on said second shaft and enclosed within said gear box for determining the direction of rotation of said second shaft and said worm and thereby the direction of movement of said second cutting blade within said frame, compression springs opposing axial movement of said second shaft in either direction whereby when said second cutting blade meets excessive resistance to movement and said worm gear tends to stop, said worm unscrews itself to compress one of said springs and thereby cause sufficient axial movement of said driven shaft to disengage said clutch from driving relationship with said driven shaft, and manually operable clutch actuating means extending externally of said gear box.

5. A tree felling device or the like comprising a frame having fixed parallel side members, a fixed gear box adjacent one end of the frame, a pair of cooperative cutting blades movable relative to one another along the length of said parallel side members for confining an article to be cut therebetween, and means for actuating one of said blades towards and away from the other blade including a driving shaft adapted to be coupled to a source of power and journaled within said gear box, a driven shaft extending across said gear box for rotational and axial movement therein, a worm carried by said driven shaft for both rotational and axial movement therewith, resilient means guided by said shaft and urging said shaft to an intermediate axially adjusted position, a worm gear in mesh with said worm and operatively connected to said one movable blade for effecting movement thereof, and a clutch for coupling said driving shaft and said driven shaft to rotate said driven shaft in a predetermined direction, said clutch being axially movable with said driven shaft after limited initial axial movement of said shaft in either direction, whereby continued rotation of said worm relative to said worm gear when the latter is held against rotation by resistance to movement of said movable blade causes axial movement of said driven shaft and of said clutch to throw said clutch out of coupling relationship with said shafts and thereby prevent damage to said driving means.

ROBERT P. INGRAHAM.
JOSEPH W. PHILLIPS.
SAM E. GANIS.

REFERENCES CITED

The following references are of record in the file of this patent:

UNITED STATES PATENTS

| Number | Name | Date |
|---|---|---|
| 1,512,181 | Knechtel | Oct. 21, 1924 |
| 1,807,367 | Woolery | May 26, 1931 |
| 1,829,249 | Von Beulwitz | Oct. 27, 1931 |
| 2,055,671 | Ridgeway | Sept. 29, 1936 |

FOREIGN PATENTS

| Number | Country | Date |
|---|---|---|
| 1,068 of 1864 | Great Britain | Apr. 28, 1864 |
| 25,450 | Austria | Aug. 25, 1906 |